(12) United States Patent
Borgné et al.

(10) Patent No.: US 8,529,992 B2
(45) Date of Patent: Sep. 10, 2013

(54) METHOD AND APPARATUS FOR COATING DUCTS

(75) Inventors: Timothy D. Borgné, Tulsa, OK (US); Jeremy S. Cupps, Tulsa, OK (US)

(73) Assignee: Duct Seal Technologies, LLC, Tulsa, OK (US)

( * ) Notice: Subject to any disclaimer, the term of this patent is extended or adjusted under 35 U.S.C. 154(b) by 579 days.

(21) Appl. No.: 12/054,264

(22) Filed: Mar. 24, 2008

(65) Prior Publication Data

US 2008/0233293 A1 Sep. 25, 2008

Related U.S. Application Data

(60) Provisional application No. 60/919,636, filed on Mar. 23, 2007.

(51) Int. Cl.
*B05D 7/00* (2006.01)
(52) U.S. Cl.
CPC ........................................ *B05D 7/00* (2013.01)
USPC .......................................................... 427/237
(58) Field of Classification Search
CPC ......................................................... B05D 7/22
USPC ................................. 427/230, 236, 237, 239
See application file for complete search history.

(56) References Cited

U.S. PATENT DOCUMENTS

| | | | |
|---|---|---|---|
| 2,513,289 A | 7/1950 | Crom | |
| 3,495,626 A | 2/1970 | Nagel | |
| 3,960,644 A | 6/1976 | McFadden | |
| 4,371,569 A * | 2/1983 | Muta et al. | 427/230 |
| 4,401,696 A | 8/1983 | Wood | |
| 4,970,364 A | 11/1990 | Muller | |
| 5,656,117 A | 8/1997 | Wood et al. | |
| 6,479,097 B1 | 11/2002 | McIntyre, Jr. et al. | |
| 6,699,324 B1 | 3/2004 | Berdin et al. | |
| 7,112,350 B1 * | 9/2006 | Roberts | 427/476 |
| 7,851,017 B2 * | 12/2010 | Wang et al. | 427/237 |
| 2003/0044523 A1 | 3/2003 | Brass | |
| 2003/0161946 A1 | 8/2003 | Moore et al. | |
| 2006/0115587 A1* | 6/2006 | Davis | 427/230 |

FOREIGN PATENT DOCUMENTS

DE  WO 0044506  8/2000

* cited by examiner

*Primary Examiner* — William Phillip Fletcher, III
(74) *Attorney, Agent, or Firm* — Fellers, Snider, Blankenship, Bailey & Tippens, P.C.

(57) ABSTRACT

The present disclosure includes a method of applying a coating material to an air duct including inserting a first end of a supply line including a spray head and a camera through a first opening in the air duct; initiating flow of coating material to the spray head through the supply line; pulling the supply line and the attached spray head and camera so that the spray head deposits coating material onto the interior surfaces of the duct while capturing the deposition of coating material using the camera. Using the process and apparatus of the present disclosure provides for the coating of the inside of a air duct while being able to observe and monitor the deposition of coating material in order to ensure that the coating material is applied consistently and evenly along the length of the air duct.

14 Claims, 6 Drawing Sheets

METHOD AND APPARATUS FOR COATING DUCTS

This application claims the benefit of U.S. provisional patent application Ser. No. 60/919,636 filed on Mar. 23, 2007, and incorporates such provisional application by reference into this disclosure as if fully set out at this point.

FIELD OF THE INVENTION

The present invention relates to the field of maintenance and repair of corroded, rusted, or otherwise damaged heating and air conditioning ducts.

BACKGROUND OF THE INVENTION

Rusted, corroded, or otherwise damaged ducts used for heating and air conditioning system applications are a known problem. When such damage is discovered, the ducts, or sections thereof, frequently have to be repaired or replaced. This is particularly true when this damage is discovered during an inspection related to the sale of real estate. This is a particular problem where the ducts are encased in a concrete slab. In such cases, the ducts can only be accessed by breaking away the section of slab, most often the floor of the property, in order to access the damaged duct section(s). This is a time consuming and costly process that is very invasive to the property in terms of disruption and debris. A need exists for a method and apparatus to repair a damaged section of duct without having to disrupt the property by replacing the section of duct.

U.S. Pat. No. 7,112,350, incorporated fully herein by reference, discloses a method and system for lining the interior of an air duct. The system disclosed in the '350 Patent, however, does not allow for the visual inspection of coating process. In addition, the system can get caught on joining sections of duct or other such irregularities requiring it to be pulled with great force such that upon release, the system jumps down the section of duct leaving a poorly, or even uncoated, section of duct. A need also exists for a system and method for coating ducts which allows for the visual inspection of the duct during application of the coating material and which is capable of traveling down the length of duct without catching onto seams, turns, or other obstructions in the duct.

SUMMARY OF THE INVENTION

Figure 1:
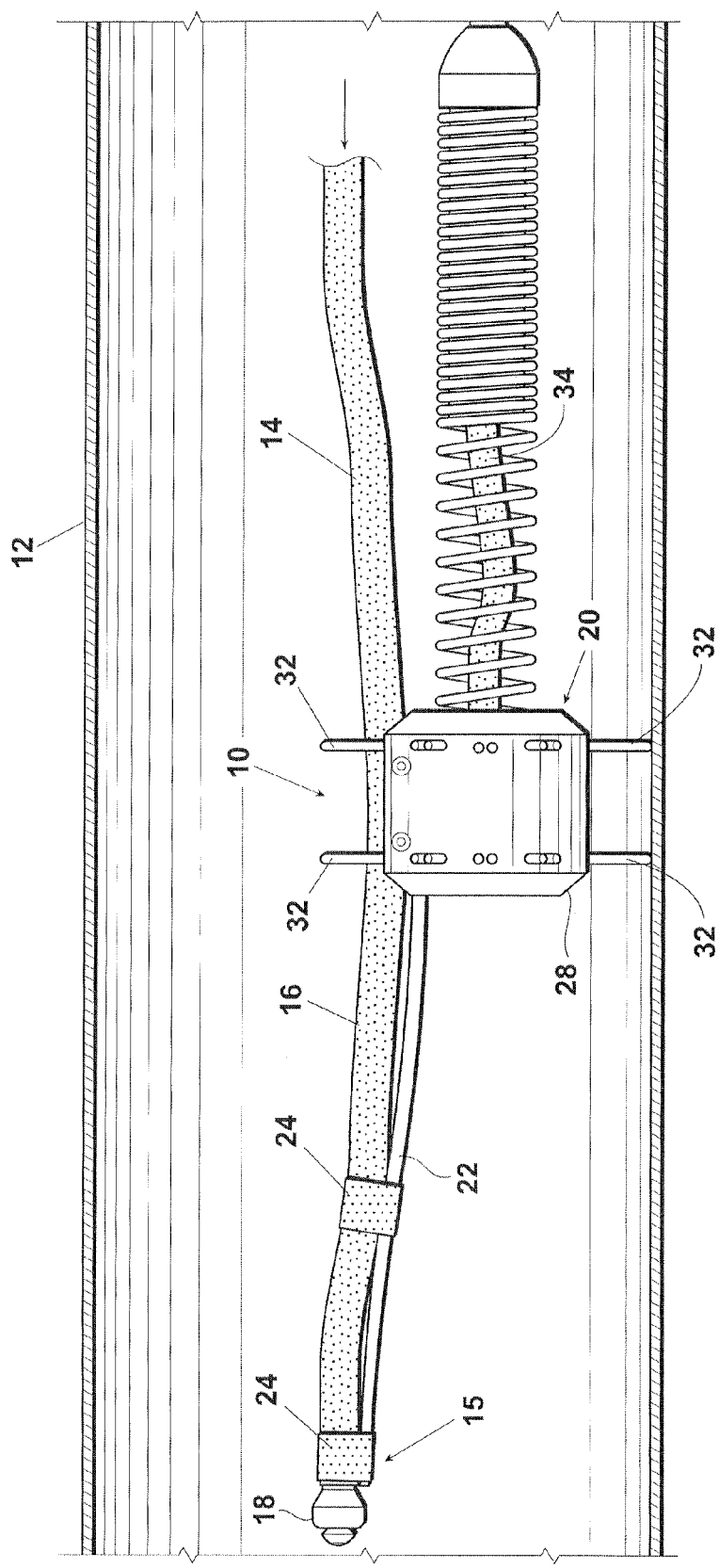
FIG. 1 is a side view of the apparatus of the present disclosure with the section of duct cut away.

The present disclosure includes a method of applying a coating material to an air duct and a preferred apparatus for accomplishing that method. Using the process and apparatus of the present disclosure provides for the coating of the inside of a air duct while being able to observe and monitor the deposition of coating material in order to ensure that the coating material is applied consistently and evenly along the length of the air duct.

The apparatus for applying the coating to a duct in the present disclosure includes, generally a supply line including a spray head. The supply line is in communication with a supply pump and supply tank for supplying the coating material to the spray head. A camera apparatus is supplied adjacent the supply line and spray head. A support apparatus is preferably provided to suspend the camera and the spray head within the duct. The camera is preferably in communication with a display monitor and storage device.

The method of applying a coating to a duct of the present disclosure includes the following general steps:

1. inserting a first end of a supply line including a spray head and a camera through a first opening in an air duct that is to be coated so that the first end of the supply line stops at the entrance to the supply plenum for an air supply unit that provides air to the air duct;

2. initiating flow of coating material to the spray head through the supply line that has its opposite second end attached to a supply pump and supply tank that are designed to supply coating material through the supply line to the spray head;

3. retracting the supply line and the attached spray head from the supply plenum toward the first opening so that the spray head deposits coating material onto the interior surfaces of the duct between the supply plenum and the first opening in the duct while capturing the deposition of coating material using the camera.

The ducts are preferably cleaned prior to application of the coating material. Cleaning removes debris and other material that may affect the coating, or the adhesion of the coating to the inside of the duct.

The method may also include suspending the spray head in the duct and most preferably in the center of the duct in order to allow the coating material radiate from the spray head. This provides for an even coating of coating material inside the duct. In addition, the camera may be suspended from the inside surface of the duct in order to provide a better view of the inside of the duct.

The first end of the supply line including the spray head and camera are preferably pulled from the first opening to the supply plenum by attaching a tether to the first end of the supply line. The first end of the supply line is then pulled through the air duct from the supply plenum to the first opening while coating material is deposited inside the duct. The deposition of the coating material is captured by the camera and preferably displayed in real time to a monitor in order to ensure complete and consistent coating of the ducts. The video image may also be stored by any known conventional means.

DETAILED DESCRIPTION OF THE PREFERRED EMBODIMENT

The apparatus for applying the coating to a duct in the present disclosure includes, generally a supply line 14 including a spray head 18. The supply line 14 is in communication with a supply pump and supply tank for supplying the coating material to spray head 18. A camera apparatus 20 is positioned adjacent supply line 14 and spray head 18. A support apparatus is preferably provided to suspend camera assembly 20 and spray head 18 within duct 12. The camera 20 is preferably in communication with a control unit 36 including a display monitor 37.

An apparatus according to the present disclosure is depicted in FIGS. 1-14.

With reference to FIGS. 1-4, an apparatus 10 for coating the inside of an air duct 12 shall be described. Apparatus 10 includes, generally, a supply line 14 for carrying a coating material having a first end 16 terminating with a spray head 18. First end 16 is supported from a camera assembly 20 such that such spray head 18 extends away from camera assembly 20 down the length of air duct 12. First end 16 and spray head 18 are preferably supported from camera assembly 20 such that spray head 18 is positioned approximately in the middle of duct 12. In a preferred embodiment, first end 16 is supported from camera assembly 20 with a semi-rigid (but yet still flexible) rod 22. First end 16 of supply line 14 may be secured to rod 22 by any acceptable means, however, in the preferred embodiment, tape, collectively 24, is used. Supply line 14 extends down the length of the duct to be coated to a first opening 40 or register and then to a supply pump and supply tank containing a supply of the coating material. It should be understood, however, that, although spray head 18 and supply line 14 are supported from camera apparatus 20 in the preferred embodiment, spray head 18 could be separately supported adjacent camera apparatus 20 without departing from the scope of the invention.

Figure 2:
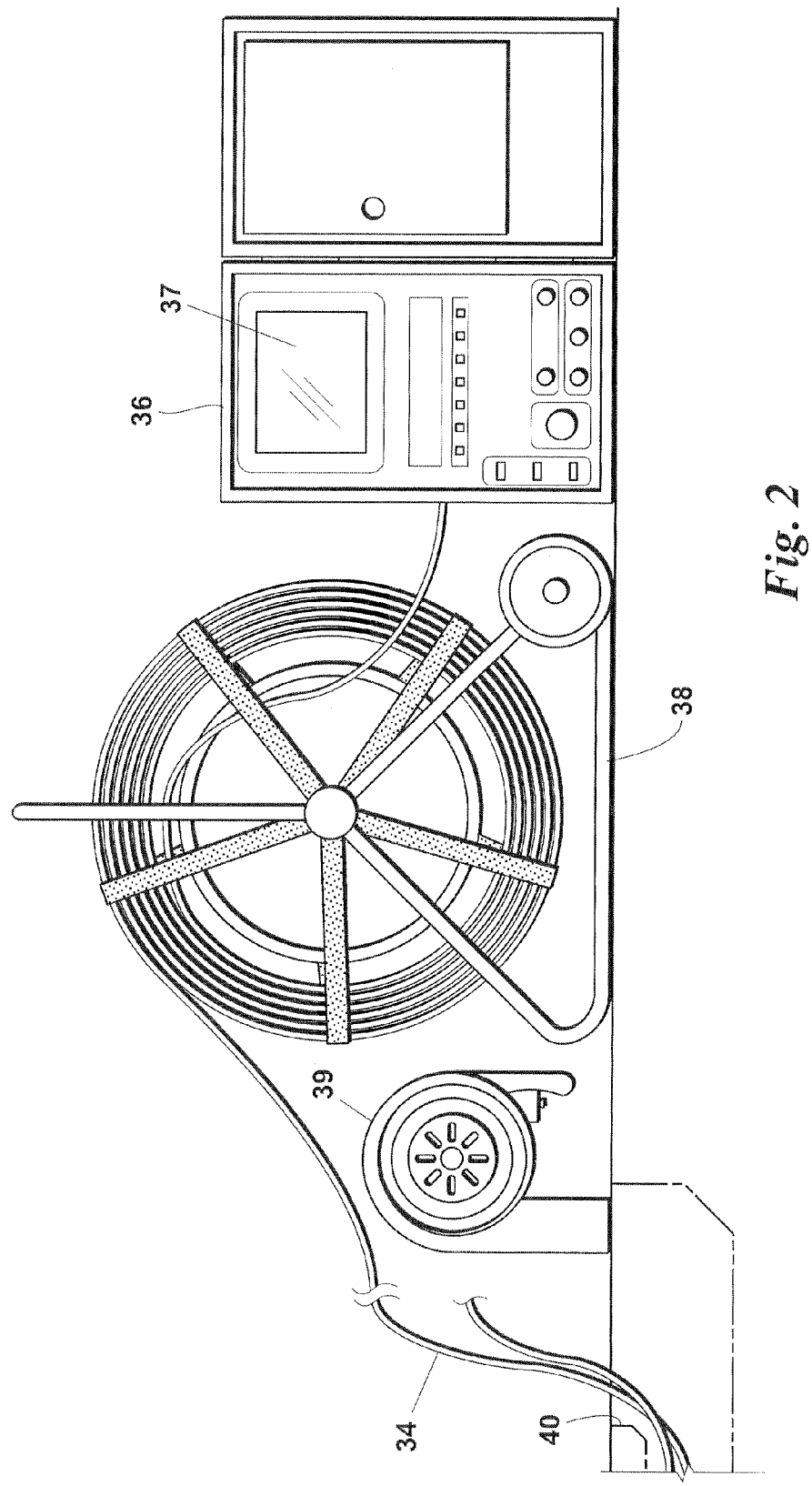
FIG. 2 is a view depicting the supply hose, camera cable, cable reel, and camera monitor and control unit of the present disclosure.

Camera assembly 20 in a preferred embodiment is supported within duct 12 so as to raise the camera from the inside surface of duct 12 to allow better viewing of the deposition of coating material. Camera assembly 20 includes a camera 26 (FIG. 4) contained within a housing 28. Camera assembly 20 also preferably includes a light 30 to illuminate the inside of the air duct. Housing 28 is supported by a plurality of semi rigid fingers, collectively 32 extending therefrom. Semi-rigid fingers 32 extend around the circumference of housing 28. A camera cable 34 extends from camera 26 in housing 28 through the duct adjacent supply line 14 to a control and monitor unit 36 (FIG. 2). A hose reel 38 may be employed to retain the camera cable 34 and/or supply line 14.

FIG. 2 also depicts an air blower 39 for providing air flow within the duct 12. This air flow keeps coating material from spraying on the lens of the camera 26. In the preferred embodiment, air blower 39 is a carpet blower, however, it is understood that other air moving devices are also contemplated. Air blower 39 may be positioned at first opening 40 as depicted, or it could be placed at the air plenum end and the flow of air reversed.

Figure 3:
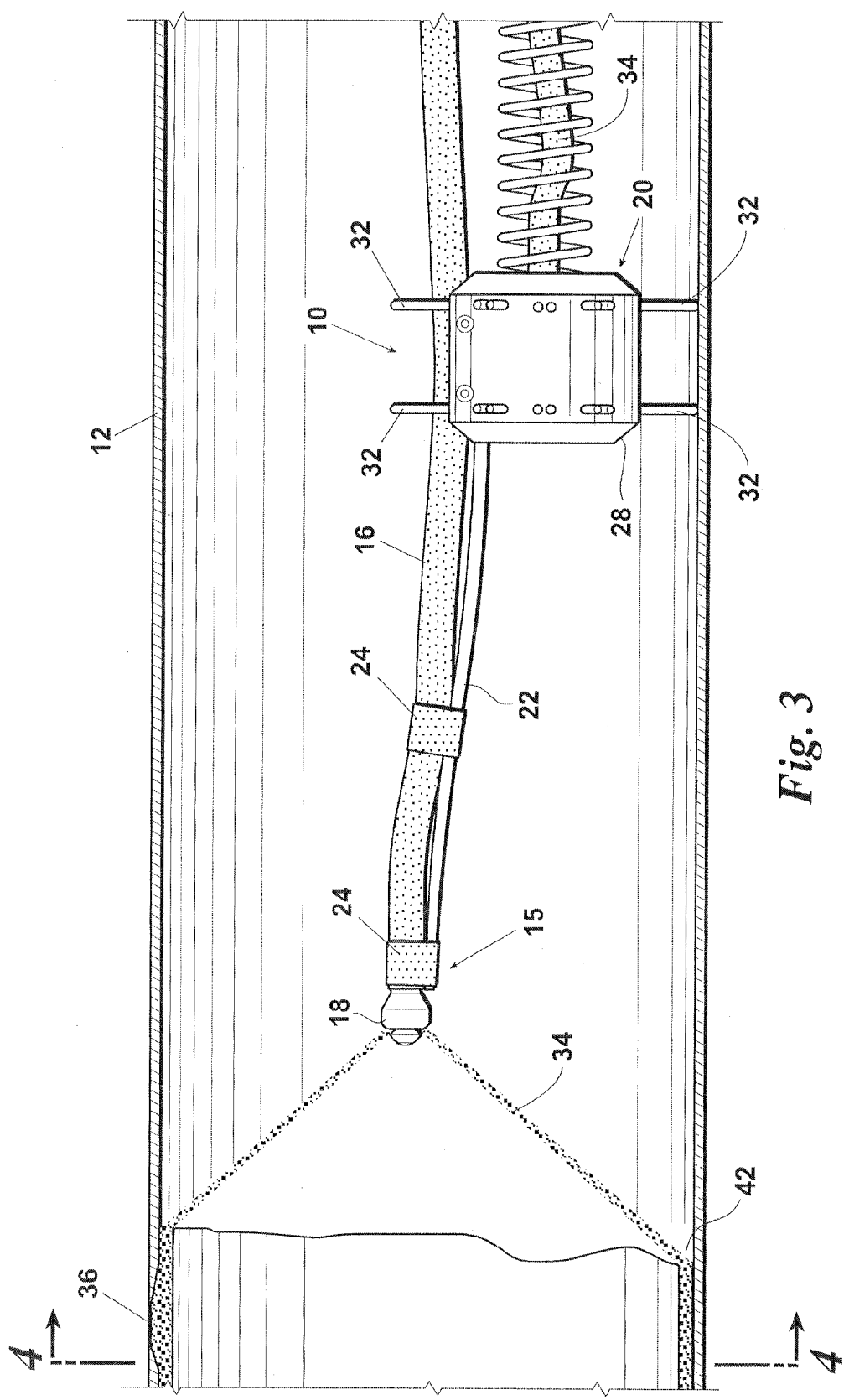
FIG. 3 is a side view of the apparatus of the present disclosure with the duct cut away depicting spraying of coating material onto the inside surface of the duct and exemplary repair of a section of duct wall.
Figure 4:
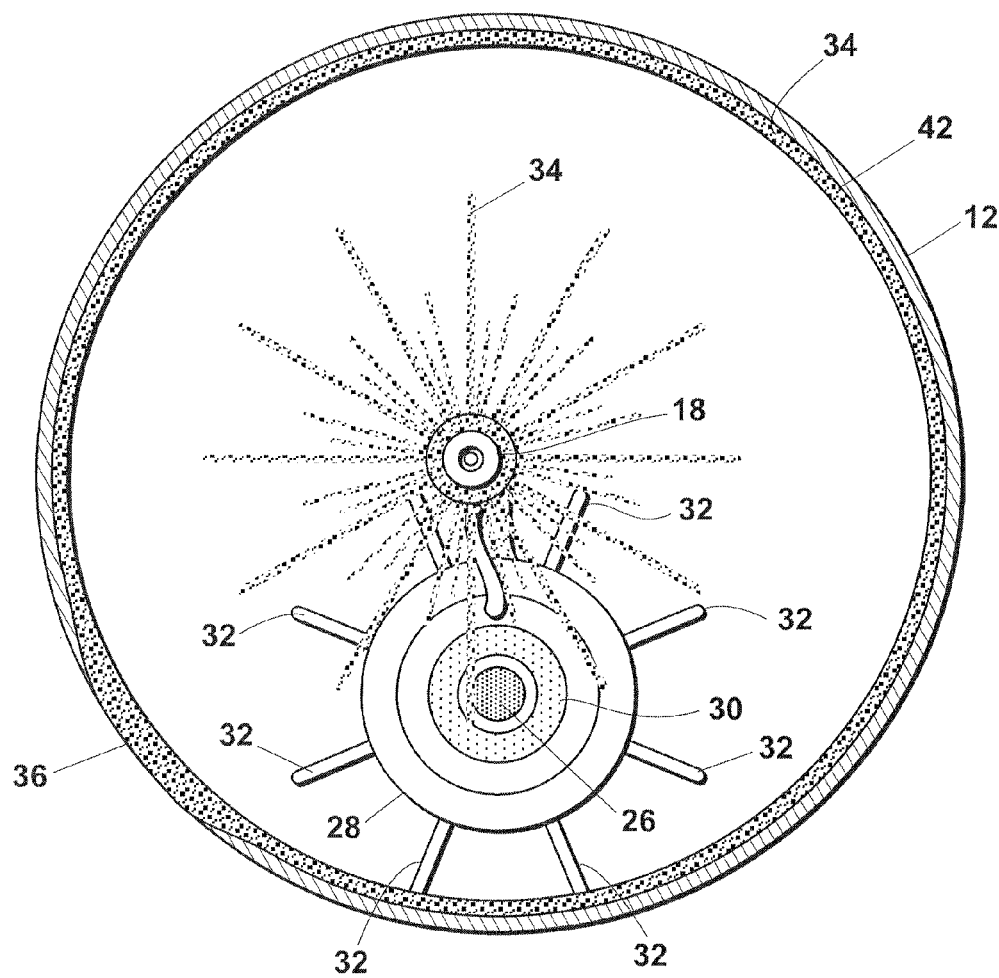
FIG. 4 is a view taken along line 4-4 of FIG. 3 depicting the camera, including light, and the spray head shown spraying coating material inside a duct.
Figure 8:
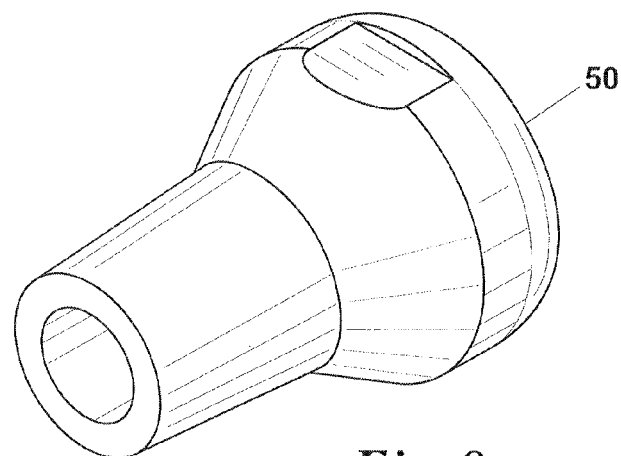
FIG. 8 is an isometric view of the spray head of FIG. 5.
Figure 7:
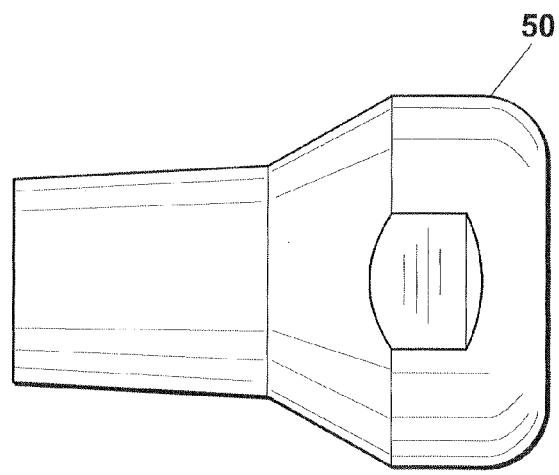
FIG. 7 is a side view of the spray head of the present disclosure with the diffuser removed.

FIGS. 3-4 depict the deposition of coating material to the inside of the duct. The method of applying a coating to a duct of the present disclosure includes the following general steps:

1. inserting the first end 15 of supply line 14 including spray head 18 and camera assembly 20 through a first opening 40 in air duct 12 that is to be coated so that the first end 15 of supply line 14 stops at the entrance to the supply plenum for an air supply unit that provides air to the air duct;

2. initiating flow of coating material 34 to the spray head 18 through supply line 14 that has its opposite second end attached to a supply pump and supply tank (see FIG. 2) that are designed to supply coating material 34 through supply line 14 to spray head 18;

3. retracting supply line 14 and attached spray head 18 from the supply plenum toward first opening 40 so that spray head 18 deposits coating material 34 onto the interior surfaces 42 of the duct 12 between the supply plenum and first opening in duct 12 while capturing the deposition of coating material 34 using camera assembly 20.

The coating material is preferably continuously applied in order to provide a consistent, even coating within the interior surface 42 of duct 12. However, it is also contemplated that the process could be used to repair any problem areas such as 36 of FIG. 3.

As seen in FIG. 4, the coating material 34 is preferably sprayed from around the circumference of spray head 18. This is to assure even coating of material 34 on the interior surface 42 of duct 12.

Interior surface 42 of duct 12 is preferably cleaned prior to application of the coating material 34. Cleaning removes debris and other material that may affect the coating or the adhesion of the coating to the inside of the duct and such cleaning processes and apparatuses are known in the art.

The method also preferably includes suspending spray head 18 in the duct 12 and most preferably in the center of duct 12 in order to allow coating material 34 to radiate from spray head 18. This provides for an even coating of coating material around the interior surface 42 of duct 12. In addition, camera 20 may be suspended from interior surface 42 of duct 12 in order to provide a better view of the interior 42 of duct 12.

The first end of the supply line including the spray head and camera are preferably pulled from the first opening to the supply plenum by attaching a tether to the first end of the supply line. The first end 15 of supply 14 line is then pulled through the duct from the supply plenum to first opening 40 while coating material 34 is deposited to the interior surface 42 of duct 12. The deposition of coating material 34 is captured by camera 20 and preferably displayed in real time to monitor 37 in order to ensure complete and consistent coating of the interior surface 42 duct 12. The video image may also be stored by any known conventional means within control unit 36. Such storage could include a digital storage device such as a hard drive or other digital storage medium or an analog storage medium such as VHS video tape.

FIGS. 5-14 depict a preferable spray head 50 and diffuser 52 for the consistent and even spray of coating material.

Figure 14:
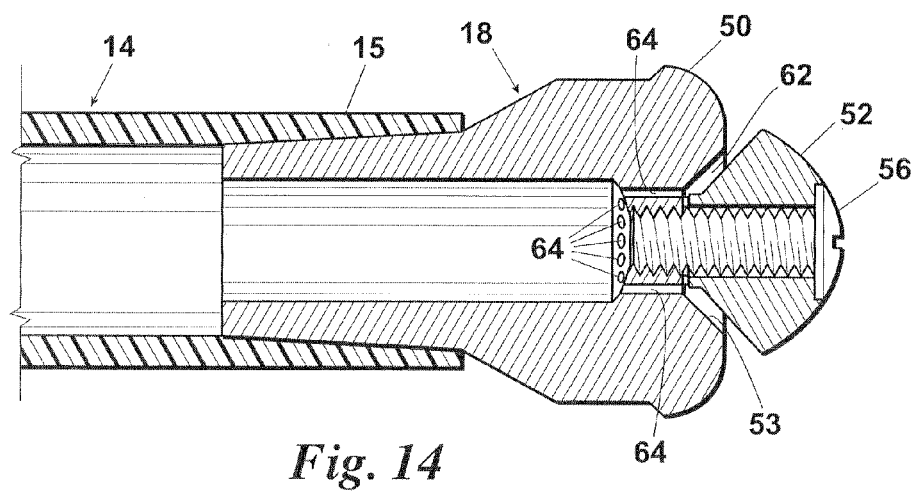
FIG. 14 is an assembled cut away view of the spray head of the present disclosure fitted to a supply line.

Spray head 18 includes nozzle 50 and diffuser 52. Diffuser 52 seats in a cut out segment 53 of nozzle 50 separated by a pair of spacers (preferably) 54. Diffuser 52 is held in nozzle 50 by a screw 56 extending through diffuser 52 and threaded into a threaded portion 60 of nozzle 50. As can be seen in FIG. 14, for example, upon assembly, a space 62 remains between nozzle 50 and diffuser 52 to allow the passage of coating material to exit around diffuser 52.

Figure 5:
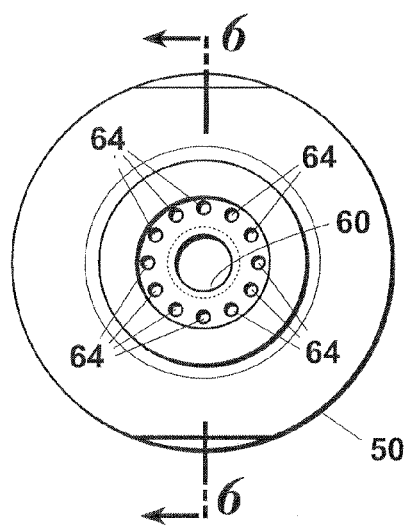
FIG. 5 is a front view of the spray head of the present invention with the diffuser removed.
Figure 6:
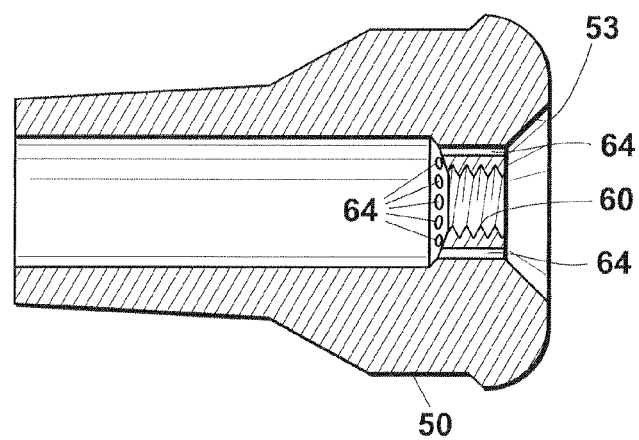
FIG. 6 is a view taken along line 6-6 of FIG. 5.
Figure 11:
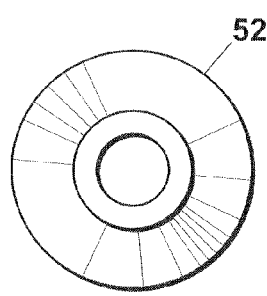
FIG. 11 is a back view of the diffuser of the spray head of the present disclosure.
Figure 9:
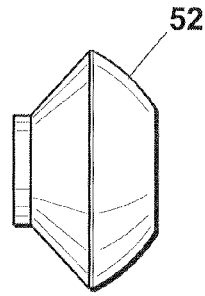
FIG. 9 is a side view of the diffuser of the spray head of the present disclosure.
Figure 10:
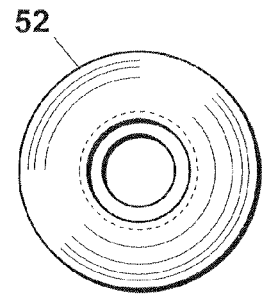
FIG. 10 is a front view of the diffuser of the spray head of the present disclosure.
Figure 12:
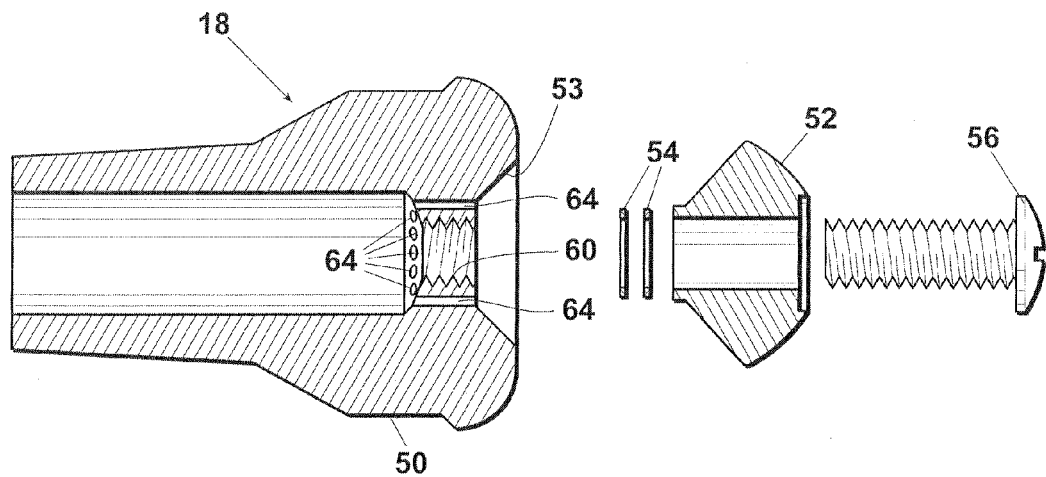
FIG. 12 is an exploded cut away view of the spray head of the present disclosure including the diffuser.
Figure 13:
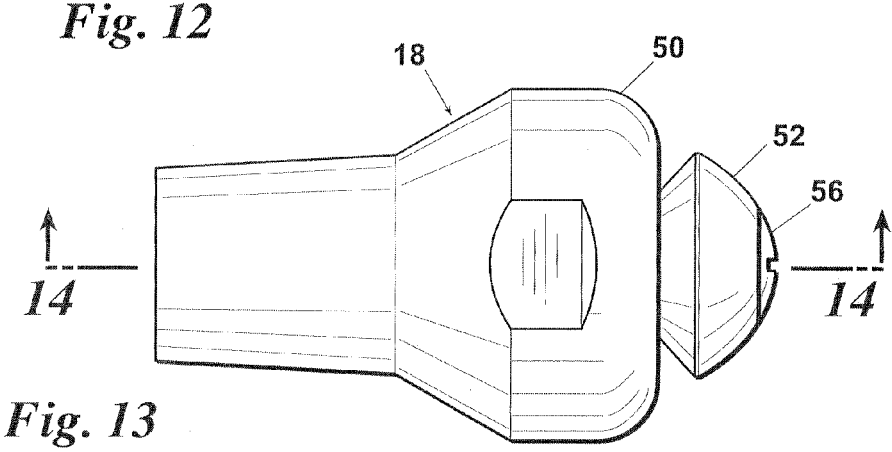
FIG. 13 is a side view of the spray head of the present disclosure including the diffuser.

As is depicted in FIG. 5, nozzle 50 preferably includes a plurality of holes, collectively 64 therein to allow the passage of coating material from first end 15 of supply line 14 through nozzle 50 to pass around diffuser 52 (FIG. 14).

Although the invention has been illustrated by the preceding apparatus and method, it is not to be construed as being limited to the materials or methods described. Various modifications and embodiments can be made without departing from the spirit or scope thereof. Furthermore, while presently preferred embodiments have been described for purposes of this disclosure, numerous changes and modifications will be apparent to those of ordinary skill in the art. Such changes and modifications are encompassed within the spirit of this invention.

What is claimed is:

1. A method of applying a coating to a duct in communication with an air supply unit, comprising:
    (a) inserting a first end of a supply line including a spray head and a camera through a first opening in an air duct that is to be coated so that the first end of the supply line stops at the entrance to the supply plenum for an air supply unit that provides air to the duct;
    (b) initiating flow of coating material to the spray head through the supply line that has its opposite second end in communication with a supply pump and supply tank that are designed to supply coating material through the supply line to the spray head;
    (c) retracting the supply line and the attached spray head and camera from the supply plenum, toward the first opening so that the spray head deposits coating material onto the interior surfaces of the duct between the supply plenum and the first opening in the duct while capturing the deposition of coating material using the camera
    (d) Simultaneously displaying the deposition of coating material captured by said monitor.

2. The method of claim 1 wherein the spray head deposits coating material onto the interior surfaces of the duct continuously between the supply plenum and the first opening in the duct.

3. The method of claim 1 wherein the deposition of coating material captured by said camera is stored.

4. The method of claim 1 wherein the duct is cleaned prior to coating.

5. The method of claim 1 wherein the spray head and camera are suspended inside the duct.

6. The method of claim 5 wherein the spray head and camera are suspended approximately in the middle of the duct.

7. The method of claim 5 wherein said spray head deposits coating material substantially evenly to the interior surfaces of the duct.

8. The method of claim 5 wherein said spray head has a circumference and deposits coating material around said circumference.

9. The method of claim 1 further including blowing air in the air duct during the deposition of coating material so as to prevent said coating material from being sprayed on said camera.

10. A method of applying a coating to a duct in communication with an air supply unit, comprising:
    (a) inserting a first end of a supply line including a spray head supported in the duct by a camera through a first opening in an air duct that is to be coated so that the first end of the supply line stops at the entrance to the supply plenum for an air supply unit that provides air to the duct;
    (b) initiating flow of coating material to the spray head through the supply line that has its opposite second end in communication with a supply pump and supply tank that are designed to supply coating material through the supply line to the spray head;
    (c) retracting the supply line and the attached spray head and camera from the supply plenum, toward the first opening so that the spray head deposits coating material onto the interior surfaces of the duct between the supply plenum and the first opening in the duct while capturing the deposition of coating material using the camera
    (d) Simultaneously displaying the deposition of coating material captured by said monitor.

11. The method of claim 10 wherein the spray head deposits coating material onto the interior surfaces of the duct continuously between the supply plenum and the first opening in the duct.

12. The method of claim 10 wherein the deposition of coating material captured by said camera is stored.

13. The method of claim 10 wherein the spray head is supported by the camera approximately in the middle of the duct.

14. The method of claim 10 further including blowing air in the air duct during the deposition of coating material so as to prevent said coating material from being sprayed on said camera.

* * * * *